(12) United States Patent
Minamibori et al.

(10) Patent No.: US 11,699,823 B2
(45) Date of Patent: Jul. 11, 2023

(54) SHAPE-FORMING PACKAGING MATERIAL, AND METHOD FOR PRODUCING POWER STORAGE DEVICE WITH SURFACE PRINTING

(71) Applicant: SHOWA DENKO PACKAGING CO., LTD., Kanagawa (JP)

(72) Inventors: Yuji Minamibori, Kanagawa (JP); Daisuke Nakajima, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 126 days.

(21) Appl. No.: 15/893,307

(22) Filed: Feb. 9, 2018

(65) Prior Publication Data

US 2018/0233712 A1 Aug. 16, 2018

(30) Foreign Application Priority Data

Feb. 10, 2017 (JP) .................................. 2017-22816

(51) Int. Cl.
*H01M 50/124* (2021.01)
*B32B 7/12* (2006.01)
(Continued)

(52) U.S. Cl.
CPC ............ *H01M 50/124* (2021.01); *B05D 5/04* (2013.01); *B29C 55/023* (2013.01); *B32B 7/12* (2013.01); *B32B 15/085* (2013.01); *B32B 15/088* (2013.01); *B32B 15/09* (2013.01); *B32B 15/20* (2013.01); *B32B 27/08* (2013.01); *B32B 27/32* (2013.01); *B32B 27/34* (2013.01); *B32B 27/36* (2013.01); *B32B 37/12* (2013.01); *B41M 3/00* (2013.01); *B41M 5/52* (2013.01); *H01M 50/119* (2021.01); *H01M 50/121* (2021.01); *H01M 50/126* (2021.01); *H01M 50/1245* (2021.01); *B05D 1/28* (2013.01); *B05D 3/0254* (2013.01);
(Continued)

(58) Field of Classification Search
CPC .......................... H01M 2/0277; H01M 2/0287
See application file for complete search history.

(56) References Cited

U.S. PATENT DOCUMENTS 9,812,678 B2 11/2017 Minamibori et al.
10,008,700 B2 6/2018 Minamibori et al.
(Continued)

FOREIGN PATENT DOCUMENTS

CN 104339765 A 2/2015
JP 2004146252 A 5/2004
(Continued)

OTHER PUBLICATIONS

English Abstract of JP-2009289533, Publication Date: Dec. 10, 2009.
(Continued)

*Primary Examiner* — Jonathan G Jelsma
(74) *Attorney, Agent, or Firm* — Millen, White, Zelano & Branigan, PC; Ryan Pool

(57) ABSTRACT

The shape-forming packaging material is a shape-forming packaging material including a heat resistant resin layer as an outer layer, a heat fusible resin layer as an inner layer, and a metal foil layer disposed between both the layers, and is configured such that a print improving resin layer is laminated on a further outer side of the heat resistant resin layer.

13 Claims, 2 Drawing Sheets

(51) Int. Cl.
    *B29C 55/02*     (2006.01)
    *B41M 3/00*     (2006.01)
    *B32B 15/20*     (2006.01)
    *B32B 15/085*     (2006.01)
    *B32B 15/088*     (2006.01)
    *B32B 27/08*     (2006.01)
    *B32B 27/32*     (2006.01)
    *B32B 37/12*     (2006.01)
    *B32B 15/09*     (2006.01)
    *B32B 27/36*     (2006.01)
    *B32B 27/34*     (2006.01)
    *B41M 5/52*     (2006.01)
    *B05D 5/04*     (2006.01)
    *H01M 50/119*     (2021.01)
    *H01M 50/121*     (2021.01)
    *H01M 50/126*     (2021.01)
    *C23C 22/07*     (2006.01)
    *B05D 3/02*     (2006.01)
    *B29K 623/00*     (2006.01)
    *B29K 677/00*     (2006.01)
    *B29K 705/02*     (2006.01)
    *B29L 31/34*     (2006.01)
    *B29L 31/00*     (2006.01)
    *B29K 667/00*     (2006.01)
    *H01M 10/0525*     (2010.01)
    *B41J 2/01*     (2006.01)
    *B05D 1/28*     (2006.01)

(52) U.S. Cl.
    CPC ...... *B05D 2201/02* (2013.01); *B05D 2401/20* (2013.01); *B05D 2503/00* (2013.01); *B05D 2504/00* (2013.01); *B29K 2623/12* (2013.01); *B29K 2667/006* (2013.01); *B29K 2677/00* (2013.01); *B29K 2705/02* (2013.01); *B29L 2031/3468* (2013.01); *B29L 2031/712* (2013.01); *B32B 2250/05* (2013.01); *B32B 2255/06* (2013.01); *B32B 2255/10* (2013.01); *B32B 2255/205* (2013.01); *B32B 2255/26* (2013.01); *B32B 2307/518* (2013.01); *B32B 2457/10* (2013.01); *B32B 2553/00* (2013.01); *B41J 2/01* (2013.01); *B41M 5/5254* (2013.01); *B41M 5/5263* (2013.01); *C23C 22/07* (2013.01); *H01M 10/0525* (2013.01)

(56) References Cited

U.S. PATENT DOCUMENTS

| | | | |
|---|---|---|---|
| 10,581,033 | B2 | 3/2020 | Amano et al. |
| 2012/0015145 | A1* | 1/2012 | Depres ............... B32B 5/02 |
| | | | 428/221 |
| 2012/0135301 | A1* | 5/2012 | Akita ............... H01M 2/0212 |
| | | | 429/185 |
| 2015/0030910 | A1* | 1/2015 | Minamibori ........ H01M 2/0262 |
| | | | 429/163 |
| 2015/0044546 | A1* | 2/2015 | Minamibori ............ B32B 15/20 |
| | | | 429/163 |
| 2015/0104593 | A1* | 4/2015 | Minamibori ........ H01M 2/0287 |
| | | | 428/35.7 |
| 2017/0155101 | A1* | 6/2017 | Mochizuki ............ B32B 15/08 |
| 2017/0279090 | A1 | 9/2017 | Amano et al. |
| 2019/0143581 | A1* | 5/2019 | Yasuda ............ H01M 50/10 |
| | | | 428/480 |

FOREIGN PATENT DOCUMENTS

| | | |
|---|---|---|
| JP | 2004-155917 A | 6/2004 |
| JP | 2009-166877 A | 7/2009 |
| JP | 2009289533 A | 12/2009 |
| JP | 2013-199723 A | 10/2013 |
| JP | 201533828 A | 2/2015 |
| JP | 2015176764 A | 10/2015 |
| JP | 2016177873 A | 10/2016 |
| JP | 2016186871 A | 10/2016 |
| WO | 16047416 A1 | 3/2016 |
| WO | WO-2017209217 A1 * | 12/2017 ............. B29C 55/12 |

OTHER PUBLICATIONS

Office Action dated Feb. 2, 2021 issued in corresponding JP patent application 2017-22816 (pp. 1-4) and english translation thereof.
Office Action dated Oct. 23, 2020 issued in corresponding Chinese patent application 201711429804.3 (pp. 1-9) and english translation thereof.
Notification of Reasons for Refusal dispatched on Nov. 4, 2020 in corresponding Japanese patent application No. 2017-22816 (p. 1-6) and english translation thereof.
Office Action dated Jun. 7, 2022 ssued in corresponding JP patent application 2017-22816 (pp. 1-7) and english translation thereof (pp. 1-6).
Office Action in corresponding JP application 2022-119577 dispatched Mar. 7, 2023 (pp. 1-3) and english translation thereof.

* cited by examiner

SHAPE-FORMING PACKAGING MATERIAL, AND METHOD FOR PRODUCING POWER STORAGE DEVICE WITH SURFACE PRINTING

BACKGROUND OF THE INVENTION

Technical Field

The present disclosure relates to a shape-forming packaging material suitably used as, for example, a case of a secondary battery (lithium-ion secondary battery) for use in a laptop computer, a cellular phone, an automobile, or a stationary device, or suitably used as, for example, a packaging material for foods or a packaging material for medicines. It also relates to a method for producing a power storage device with surface printing and a method for producing a shaped case using the shape-forming packaging material.

Description of the Related Art

The following description of related art sets forth the inventors' knowledge of related art and certain problems therein and should not be construed as an admission of knowledge in the prior art.

It is becoming more common to print a lot number, a QR code (which is a registered trademark), etc., on the outer surface of a packaging material for a battery, such as, e.g., a lithium-ion secondary battery. Such printing is carried out by using an ink, such as, e.g., a dye ink.

For example, in a battery pack in which printing by a dye ink (oil-based dye ink or the like) is provided on a battery outer frame and a masking adhesive label is pasted on the printing, a structure is known in which the masking adhesive label is composed of a white ink layer formed on one surface of a white resin film substrate and a black ink layer and a pressure-sensitive adhesive layer formed on the other side thereof (Patent Document 1).

Patent Document 1: Japanese Unexamined Patent Application Publication No. 2009-289533

Problems to be Solved by the Invention

However, when a lot number, a QR code (which is a registered trademark), etc., is printed on the outer surface of the outer resin layer of the battery packaging material, there are following problems.

That is, there is a problem that when a battery packaged with the packaging material is used in a somewhat harsh environment, such as, e.g., a high temperature environment and a high humidity environment, the ink at the print portion blurs. There was also a problem that the print portion was likely to be peeled off due to the contact with a solvent or the like. These problems were also likely to occur during the shape-forming or heat sealing of the packaging material.

SUMMARY OF THE INVENTION

Some embodiments in this disclosure have been developed in view of such technical background.

An object of some embodiments of this disclosure is to provide a shape-forming packaging material in which an ink at a print portion does not blur even at the time of shape-forming or heat sealing or even if it is used in a somewhat harsh environment, such as, e.g., a high temperature environment and a high humidity environment, and a print portion is not peeled off due to the contact with a solvent, etc.

Another object of some embodiments of the present disclosure is to provide a method for producing a power storage device with surface printing.

Still another object of some embodiments of the present disclosure is to provide a method for producing a shaped case using the shape-forming packaging material.

Means for Solving the Problems

In order to attain the aforementioned objects, some embodiments of the present disclosure provide the following means.

[1] A shape-forming packaging material comprising:
a heat resistant resin layer as an outer layer;
a heat fusible resin layer as an inner layer; and
a metal foil layer disposed between both the layers,
wherein a print improving resin layer is laminated on a further outer side of the heat resistant resin layer.

[2] In the shape-forming packaging material as recited in the aforementioned Item [1], it may be configured such that the print improving resin layer contains one or more resins selected from the group consisting of an epoxy resin, a urethane resin, an acrylic acid resin, a methacrylic acid resin, an acrylic acid ester resin, a methacrylic acid ester resin, a polyester resin, and a polyethyleneimine resin.

[3] In the shape-forming packaging material as recited in the aforementioned Item [1], it may be configured such that the print improving resin layer contains a urethane resin and an epoxy resin.

[4] In the shape-forming packaging material as recited in the aforementioned Item [3], it may be configured such that in the print improving resin layer, a content mass ratio of the urethane resin/the epoxy resin is in a range of 98/2 to 40/60.

[5] In the shape-forming packaging material as recited in the aforementioned Item [1], it may be configured such that the print improving resin layer contains one or more acrylic resins selected from the group consisting of an acrylic acid ester resin and a methacrylic acid ester resin, and an epoxy resin.

[6] In the shape-forming packaging material as recited in the aforementioned Item [5], it may be configured such that in the print improving resin layer, a content mass ratio of the acrylic resin/the epoxy resin is in a range of 98/2 to 40/60.

[7] In the shape-forming packaging material as recited in any one of the aforementioned Items [1] to [6], it may be configured such that the print improving resin layer is an adhesive layer formed by applying a resin-water-based emulsion to the heat resistant resin layer.

[8] In the shape-forming packaging material as recited in any one of the aforementioned Items [1] to [7], it may be configured such that the heat resistant resin layer is composed of a biaxially stretched polyamide film, a biaxially stretched polyethylene naphthalate film, a biaxially stretched polyethylene terephthalate film, or a biaxially stretched polybutylene terephthalate film.

[9] In the shape-forming packaging material as recited in any one of the aforementioned Items [1] to [8], it may be configured such that a lubricant is adhered to an outer surface of the print improving resin layer.

[10] In the shape-forming packaging material as recited in the aforementioned Item [9], it may be configured such that in the heat fusible resin layer contains a lubricant, and the lubricant on the outer surface of the print improving resin layer is a lubricant presented on a surface of the heat fusible resin layer and transferred to the outer surface of the print improving resin layer.

[11] A method for producing a shaped case, comprising:
deep drawing or stretch forming the shape-forming packaging material as recited in any one of the aforementioned Items [1] to [10].

[12] A method for producing a battery case, comprising:
deep drawing or stretch forming the shape-forming packaging material as recited in any one of the aforementioned Items [1] to [10].

[13] A method for producing a power storage device with surface printing, comprising:
obtaining a roll body by rolling the shape-forming packaging material containing a lubricant in the heat fusible resin layer as recited in any one of the aforementioned Items [1] to [8] in a manner such that the heat fusible resin layer and the print improving resin layer are in contact with each other;
obtaining a power storage device by unrolling the shape-forming packaging material from the roll body and packaging a power storage device main body with the unrolled shape-forming packaging material; and
printing on the outer surface of a print improving resin layer of a shape-forming packaging material in a state in which the power storage device is packaged.

[14] In the method for producing a power storage device with surface printing as recited in the aforementioned Item [13], it may be configured such that a lubricant is adhered to the outer surface of the print improving resin layer of the shape-forming packaging material unrolled from the roll body, and the lubricant on the outer surface of the print improving resin layer is a lubricant presented on a surface of the heat fusible resin layer and transferred to the outer surface of the print improving resin layer when rolled, and the printing is performed on the outer surface of the print improving resin layer to which the lubricant is adhered.

In some embodiments of this disclosure, since the print improving resin layer is laminated on a further outer side of the heat resistant resin layer, the ink at the print portion will not blur at the time of subjecting the shape-forming packaging material to shaping, such as, e.g., deep drawing, stretch forming, etc., or at the time of heat sealing the packaging material for sealing, and the print portion will not be peeled off due to the contact with a solvent, etc. Even when it is used in a somewhat harsh environment, such as, e.g., a high temperature environment and a high humidity environment, the ink at the print portion will not blur, and the print portion will not be peeled off due to the contact with a solvent, etc.

In the embodiment as recited in the aforementioned Item [2], the print improving resin layer is configured to contain one or more resins selected from the group consisting of an epoxy resin, a urethane resin, an acrylic acid resin, a methacrylic acid resin, an acrylic acid ester resin, a methacrylic acid ester resin, a polyester resin, and a polyethyleneimine resin. Therefore, blurring of the ink of the print portion can be sufficiently prevented at the time of shaping, heat sealing, or using in a somewhat harsh environment, such as, e.g., a high temperature environment and a high humidity environment, and it is also possible to sufficiently prevent the print portion from being peeled off due to the contact with a solvent or the like.

In the embodiment as recited in the aforementioned Item [3], the print improving resin layer is configured to contain a urethane resin and an epoxy resin. Therefore, blurring of the ink of the print portion can be more sufficiently prevented at the time of shaping, heat sealing, or using in a somewhat harsh environment, such as, e.g., a high temperature environment and a high humidity environment. Furthermore, it is also possible to more sufficiently prevent the print portion from being peeled off due to the contact with a solvent or the like.

According to the embodiment as recited in the aforementioned item [4], the content mass ratio of the urethane resin/the epoxy resin is in a range of 98/2 to 40/60. Therefore, blurring of the ink of the print portion can be more sufficiently prevented at the time of shaping, heat sealing, or using in a somewhat harsh environment, such as, e.g., a high temperature environment and a high humidity environment. It is also possible to more sufficiently prevent the print portion from being peeled off due to the contact with a solvent or the like.

According to the embodiment as recited in the aforementioned item [5], the print improving resin layer is configured to contain one or more acrylic resins selected from the group consisting of an acrylic acid ester resin and a methacrylic acid ester resin, and an epoxy resin. Therefore, blurring of the ink of the print portion can be more sufficiently prevented at the time of shaping, heat sealing, or using in a somewhat harsh environment, such as, e.g., a high temperature environment and a high humidity environment, and it is also possible to more sufficiently prevent the print portion from being peeled off due to the contact with a solvent or the like.

According to the embodiment as recited in the aforementioned item [6], the content mass ratio of the acrylic resin/the epoxy resin is in a range of 98/2 to 40/60. Therefore, blurring of the ink of the print portion can be more sufficiently prevented at the time of shaping, heat sealing, or using in a somewhat harsh environment, such as, e.g., a high temperature environment and a high humidity environment, and it is also possible to more sufficiently prevent the print portion from being peeled off due to the contact with a solvent or the like.

In the embodiment as recited in the aforementioned Item [7], the print improving resin layer is an adhesive layer formed by applying a resin-water-based emulsion to the heat resistant resin layer. Therefore, blurring of the ink of the print portion can be more sufficiently prevented at the time of shaping, heat sealing, or using in a somewhat harsh environment, such as, e.g., a high temperature environment and a high humidity environment, and it is also possible to more sufficiently prevent the print portion from being peeled off due to the contact with a solvent or the like.

In the embodiment as recited in the aforementioned Item [8], the heat resistant resin layer is composed of a biaxially stretched polyamide film, a biaxially stretched polyethylene naphthalate film, a biaxially stretched polyethylene terephthalate film, or a biaxially stretched polybutylene terephthalate film. Therefore, blurring of the ink of the print portion can be more sufficiently prevented, and it is also possible to more sufficiently prevent the print portion from being peeled off due to the contact with a solvent or the like.

In the embodiment as recited in the aforementioned Item [9] or [10], although a lubricant is adhered to the outer surface of the print improving resin layer, with regard to those to which a lot number, a QR code (which is a registered trademark), etc., is printed on the outer surface of the printing improving resin layer of the shape-forming packaging material which is under the aforementioned situation, blurring of the ink of the print portion can be sufficiently prevented at the time of shaping, heat sealing, or using in a somewhat harsh environment, such as, e.g., a high temperature environment and a high humidity environment, and it is also possible to sufficiently prevent the print portion from being peeled off due to the contact with a solvent or the like.

When a lubricant is adhered directly to a surface of a heat resistant resin layer, i.e., when ink printing is performed on a surface of a heat resistant resin layer to which the lubricant is adhered, it is difficult for the ink to fix and it is difficult for a good print portion (print layer etc.) to be formed. However, in the embodiment as recited in the aforementioned Item [9] or [10], it is configured such that a lubricant is adhered to the outer surface of the print improving resin layer provided outside the heat resistant resin layer. Therefore, since the affinity between the ink improving resin layer and ink is improved even if there exists a lubricant in between, printing ink will never be repelled (that is, printing ink pushes out a lubricant), and the printing ink can be well fixed and a stable print portion (a print layer, etc.) can be formed.

In the embodiment as recited in the aforementioned Item [11], even when it is used in a slightly harsh environment, such as, e.g., a high temperature environment and a high humidity environment, as well as during the heat sealing, blurring of the ink of the print portion can be prevented, and it is also possible to produce a shaped case capable of preventing the print portion from being peeled off due to the contact with a solvent or the like.

According to the embodiment as recited in the aforementioned item [12], even when it is used in a slightly harsh environment, such as, e.g., a high temperature environment and a high humidity environment, as well as during the heat sealing, blurring of the ink of the print portion can be prevented, and it is also possible to produce a battery case capable of preventing the print portion from being peeled off due to the contact with a solvent or the like.

In the embodiment as recited in the aforementioned Item [13] or [14], blurring of the ink of the print portion can be sufficiently prevented at the time of shaping, heat sealing, or using in a somewhat harsh environment, such as, e.g., a high temperature environment and a high humidity environment, and it is also possible to produce a power storage device to which surface printing is performed capable of sufficiently preventing the print portion from being peeled off due to the contact with a solvent or the like.

BRIEF DESCRIPTION OF THE DRAWINGS

Some embodiments of the present disclosure are shown by way of example, and not limitation, in the accompanying figures.

EMBODIMENTS FOR CARRYING OUT THE INVENTION

In the following paragraphs, some embodiments in this disclosure will be described by way of example and not limitation. It should be understood based on this disclosure that various other modifications can be made by those in the art based on these illustrated embodiments.

Figure 1:
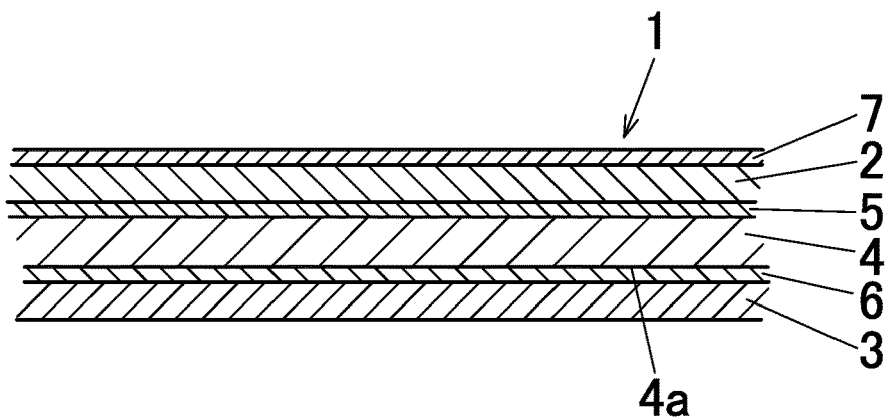
FIG. 1 is a cross-sectional view showing one embodiment of a shape-forming packaging material according to the present invention.

An embodiment of a shape-forming packaging material 1 according to the present invention is shown in FIG. 1. This shape-forming packaging material 1 is used as a packaging material for a lithium ion secondary battery case. That is, the shape-forming packaging material 1 is subjected to shaping, such as, e.g., deep drawing, and is used as a secondary battery case.

The shape-forming packaging material 1 is configured such that a heat resistant resin layer (outer layer) 2 is integrally laminated on one surface (upper surface) of a metal foil layer 4 via a first adhesive layer 5 and a heat fusible resin layer (inner layer) 3 is integrally laminated on the other surface (lower surface) of the metal foil layer 4 via a second adhesive layer 6, and a print improving resin layer 7 is laminated on the outer side of the heat resistant resin layer 2 (on the side opposite to the metal foil layer 4 side in the heat resistant resin layer 2). In this embodiment, the print improving resin layer 7 is laminated on the outer surface of the heat resistant resin layer 2 (on the side opposite to the metal foil layer 4 side of the heat resistant resin layer 2) (see FIG. 1). Further, in this embodiment, the print improving resin layer 7 is laminated by applying a resin composition directly to the outer surface of the heat resistant resin layer 2 by a gravure roll coating method.

The heat resistant resin layer (outer layer) 2 is a member mainly playing a role of ensuring a good formability as a packaging material, that is, it plays a role of preventing breakage due to necking of the metal foil at the time of shaping.

As the heat resistant resin constituting the heat resistant resin layer (outer layer) 2, a heat resistant resin which does not melt at a heat sealing temperature at the time of heat-sealing a shape-forming packaging material is used. As the heat resistant resin, it is preferable to use a heat resistant resin having a melting point higher than the melting point of the resin constituting the heat fusible resin layer 3 by 10° C. or more, and particularly preferable to use a heat resistant resin having a melting point higher than the melting point of the resin constituting the heat fusible resin layer 3 by 20° C. or more.

The heat resistant resin layer (outer layer) 2 is not particularly limited, and examples thereof include a stretched polyamide film such as a stretched nylon film, a stretched polyester film and the like. Among them, as the heat resistant resin stretched film layer 2, it is particularly preferable to use a biaxially stretched polyamide film such as a biaxially stretched nylon film, a biaxially stretched polybutylene terephthalate (PBT) film, a biaxially stretched polyethylene terephthalate (PET) film or a biaxially stretched polyethylene naphthalate (PEN) film. Also, as the heat resistant resin stretched film layer 2, it is preferable to use a heat resistant resin biaxially stretched film drawn by a simultaneous biaxial stretching method. Further, it is preferable to use a heat resistant resin biaxially stretched film in which the ratio (MD/TD) of the "hot water shrinkage percentage in the M direction" to the "hot water shrinkage percentage in the T direction" is within the range of 0.9 to 1.1. In the case of adopting the configuration in which the ratio (MD/TD) is within the range of 0.9 to 1.1, a packaging material with particularly good formability can be obtained. Note that the "M direction" means a "machine flow direction" and the "T direction" means a "direction orthogonal to the M direction". The nylon film is not particularly limited, but is exemplified by a 6 nylon film, a 6, 6 nylon film, an MXD nylon film, and the like. The heat resistant resin layer 2 may be made of a single layer (single stretched film) or may be made of multiple layers (multiple layers composed of a stretched PET film/a stretched nylon film, etc.) made of, for example, a stretched polyester film/a stretched polyamide film.

Note that the heat resistant resin layer (outer layer) 2 may be a resin layer formed by applying a heat resistant resin.

In the present disclosure, it is preferable that the heat resistant resin layer 2 is composed of a heat resistant resin stretched film having a hot water shrinkage percentage of 2% to 20%. When the hot water shrinkage percentage is 2% or more, the heat resistant resin layer 2 can be prevented from being locally deformed (stretched) during shaping, and the print portion (print layer, etc.) 7 can be prevented from being peeled from the heat resistant resin layer 2 at the time of using in a somewhat harsh environment, such as, e.g., a high temperature environment and a high humidity environment. When the hot water shrinkage percentage is 20% or less, at the time of shaping, such as, e.g., deep drawing and stretch forming, the print portion (print layer, etc.) 7 of the shape-forming packaging material can be prevented from being peeled from the heat resistant resin layer 2 due to the shrinkage of the heat resistant resin layer 2. In particular, it is preferable to use a heat resistant resin stretched film having a hot water shrinkage percentage of 2.5 to 10% as the heat resistant resin stretched film. In addition, it is more preferable to use a heat resistant resin stretched film having a hot water shrinkage percentage of 3.0% to 6.0%, and particularly preferable to use a heat resistant resin stretched film having a hot water shrinkage percentage of 3.5% to 5.0%.

Particularly, as the heat resistant resin stretched film 2, it is preferable to use a biaxially stretched polyamide film having a hot water shrinkage percentage of 2 to 20%, a biaxially stretched polyethylene naphthalate (PEN) film having a hot water shrinkage percentage of 2 to 20%, a biaxially stretched polybutylene terephthalate (PBT) film having a hot water shrinkage percentage of 2 to 20%, or a biaxially stretched polyethylene terephthalate (PET) film having a hot water shrinkage percentage of 2 to 20%. In this case, at the time of shaping, heat sealing, or using in a somewhat harsh environment, such as, e.g., a high temperature environment and a high humidity environment, it is possible to further enhance the effect of preventing the print portion (print layer, etc.) 11 from being peeled from the print improving resin layer 7.

The "hot water shrinkage percentage" is a dimensional change rate of a test piece (10 cm×10 cm) of a heat resistant resin stretched film 2 in the stretching direction before and after immersion of the test piece in 95° C. hot water for 30 minutes, and can be obtained by the following equation.

hot water shrinkage percentage(%)={(X−Y)/X}×100 where X is a dimension in the stretching direction before immerse treatment, and Y is a dimension in the stretching direction after immerse treatment.

The hot water shrinkage percentage in the case of adopting a biaxially stretched film is an average value of the dimensional change rate in the two stretching directions.

The hot water shrinkage percentage of the heat resistant resin stretched film can be controlled by adjusting, for example, the heat setting temperature at the time of stretching.

The thickness of the heat resistant resin layer 2 is preferably 12 μm to 50 μm. In the case of using a polyester film, it is preferable that the thickness be 12 μm to 50 μm, and in the case of using a nylon resin, it is preferable that the thickness be 15 μm to 50 μm. By setting the thickness to a value equal to or larger than the aforementioned preferred lower limit value, it is possible to ensure a sufficient strength as a shape-forming packaging material 1. By setting the thickness to a value equal to or smaller than the aforementioned preferred upper limit, it is possible to reduce the stress at the time of shaping, such as, e.g., stretch forming and drawing, thereby improving the formability.

In the present disclosure, it is required that the print improving resin layer 7 is laminated on the outer side of the heat resistant resin layer 2 (on the side opposite to the metal foil layer 4 side of the heat resistant resin layer 2). Since such a print improving resin layer 7 is provided outside the heat resistant resin layer 2, it is possible to obtain such effects that blurring of the ink of the print portion can be sufficiently prevented at the time of shaping, heat sealing, or using in a somewhat harsh environment, such as, e.g., a high temperature environment and a high humidity environment and the print portion can be sufficiently prevented from being peeled off due to the contact with a solvent or the like. Note that it is preferable to enhance the wettability by performing a corona treatment, etc., before laminating the print improving resin layer 7 on the outer surface (surface on which the print improving resin layer 7 is laminated) of the heat resistant resin layer 2.

The print improving resin layer 7 is not particularly limited, but it is preferable that the layer be formed of a layer containing one or more resins selected from the group consisting of an epoxy resin, a urethane resin, an acrylic acid resin (not including an acrylic acid ester resin), a methacrylic acid resin (not including a methacrylic acid ester resin), an acrylic acid ester resin, a methacrylic acid ester resin, a polyester resin, and a polyethyleneimine. In this case, even if the shape-forming packaging material 1 is used in a somewhat harsh environment, such as, a high temperature environment and a high humidity environment, blurring of the ink of the print portion can be sufficiently prevented and the print portion can be sufficiently prevented from being peeled off due to the contact with a solvent or the like.

Among them, it is particularly preferable that the print improving resin layer 7 be composed of a urethane resin and an epoxy resin, or composed of a (meth) acrylic acid ester resin and an epoxy resin. In this case, even if the shape-forming packaging material 1 is used in a somewhat harsh environment, such as, a high temperature environment and a high humidity environment, blurring of the ink of the print portion can be more sufficiently prevented and the print portion can be more sufficiently prevented from being peeled off due to the contact with a solvent or the like.

In the case of adopting the former configuration, the content mass ratio of the urethane resin/the epoxy resin in the print improving resin layer 7 is preferably in the range of 98/2 to 40/60. In this case, even if the shape-forming packaging material 1 is used in a somewhat harsh environment, such as, a high temperature environment and a high humidity environment, blurring of the ink of the print portion can be more sufficiently prevented and the print portion can be more sufficiently prevented from being peeled off due to the contact with a solvent or the like. When the content ratio of the urethane resin becomes larger than the content mass ratio (98/2) of the urethane resin/the epoxy resin, the degree of crosslinking becomes insufficient and it becomes difficult to sufficiently obtain the solvent resistance of the print improving resin layer 7, which is not preferable. On the other hand, when the content ratio of the urethane resin becomes smaller than the content ratio of the urethane resin/epoxy resin (40/60), it takes too much time to complete the crosslinking, which is not preferable. Among them, the content mass ratio of the urethane resin/the epoxy resin in the print improving resin layer 7 is more preferably in the range of 90/10 to 50/50.

Further, in the case of adopting the latter configuration, the content mass ratio of the (meth) acrylic acid ester resin/the epoxy resin in the print improving resin layer 7 is preferably in the range of 98/2 to 40/60. In this case, even if the shape-forming packaging material 1 is used in a somewhat harsh environment, such as, a high temperature environment and a high humidity environment, blurring of the ink of the print portion can be more sufficiently prevented and the print portion can be more sufficiently prevented from being peeled off due to the contact with a solvent or the like. When the content ratio of the (meth) acrylic acid ester resin becomes larger than the content mass ratio (98/2) of the (meth) acrylic acid ester resin/the epoxy resin, the degree of crosslinking becomes insufficient and it is difficult to sufficiently obtain the solvent resistance of the print improving resin layer 7, which is not preferable. On the other hand, when the content ratio of the (meth) acrylic acid ester resin is smaller than the content mass ratio (40/60) of the (meth) acrylic acid ester resin/the epoxy resin, the time to complete the crosslinking is too long, which is not preferable. Among them, the content mass ratio of the (meth) acrylic acid ester resin/the epoxy resin in the print improving resin layer 7 is more preferably in the range of 90/10 to 50/50. A surfactant, such as, e.g., glycols and ethylene oxide adducts of glycol, may be added to the aqueous resin emulsion (resin-water emulsion) for forming the print improving resin layer 7. In this case, a sufficient defoaming effect can be obtained in the aqueous resin emulsion, so that the print improving resin layer 7 having excellent surface smoothness can be formed. It is preferable that 0.01 mass % to 2.0 mass % of the surfactant be contained in the aqueous resin emulsion.

The resin aqueous emulsion (resin-aqueous emulsion) for forming the print improving resin layer 7 preferably contains inorganic fine particles, such as, e.g., silica and colloidal silica. In this case, an anti-blocking effect can be obtained. It is preferable to add 0.1 to 10 parts by mass of the inorganic fine particles to 100 parts by mass of the resin component.

The formation amount of the print improving resin layer 7 (solid content after drying) is preferably in the range of 0.01 g/m$^2$ to 0.5 g/m$^2$. When it is 0.01 g/m$^2$ or more, the solvent resistance of the print improving resin layer 7 can be improved, and when it is 0.5 g/m$^2$ or less, the cost can be reduced and economical.

Further, the thickness of the print improving resin layer 7 (thickness after drying) is preferably 0.01 μm to 10 μm, more preferably 0.1 μm to 5 μm.

The content rate of the resin in the print improving resin layer (after drying) 7 is preferably 88 mass % to 99.9 mass %.

The method for forming the print improving layer 7 is not particularly limited, but, for example, the print improving resin layer 7 can be formed by applying an aqueous emulsion (aqueous emulsion) of one or two kinds of resins selected from the group consisting of an epoxy resin, a urethane resin, an acrylic acid ester resin, a methacrylic acid ester resin, a polyester resin, and a polyethyleneimine resin on the surface of a base material layer (heat resistant resin layer) 2 and drying the emulsion. The coating method is not particularly limited, and examples thereof include a spray coating method, a gravure roll coating method, a reverse roll coating method, a lip coating method, and the like.

The heat fusible resin layer (inner layer) 3 plays a role of imparting excellent chemical resistance against a highly corrosive electrolyte used in a lithium ion secondary battery and the like and also imparting a heat sealing property to the shape-forming packaging material.

The heat fusible resin layer 3 is not particularly limited, but is preferably a thermoplastic resin unstretched film layer. The thermoplastic resin unstretched film layer 3 is not particularly limited, but is preferably configured by an unstretched film made of at least one kind of thermoplastic resin selected from the group consisting of polyethylene, polypropylene, an olefin copolymer, an acid modified product thereof, and an ionomer.

The thickness of the heat fusible resin layer 3 is preferably set to 20 μm to 80 μm. By setting the thickness to 20 μm or more, it is possible to sufficiently prevent occurrence of pinholes, and by setting it to 80 μm or less, the amount of resin used can be reduced and cost reduction can be attained. Among them, the thickness of the heat fusible resin layer 3 is especially set to 30 μm to 50 μm. The heat fusible resin layer 3 may be a single layer or multiple layers.

A lubricant is usually added to the heat fusible resin layer 3. By adding the lubricant, the formability at the time of shaping can be improved. The content rate of the lubricant in the heat fusible resin layer 3 is preferably set in the range of 200 ppm to 5,000 ppm.

The lubricant is not particularly limited, but examples thereof include saturated fatty acid amide, unsaturated fatty acid amide, substituted amide, methylol amide, saturated fatty acid bis-amide, unsaturated fatty acid bis-amide, fatty acid ester amide, aromatic bis-amide and the like.

The saturated fatty acid amide is not particularly limited, and examples thereof include lauric acid amide, palmitic acid amide, stearic acid amide, behenic acid amide, hydroxystearic acid amide, and the like. The unsaturated fatty acid amide is not particularly limited, and examples thereof include oleic acid amide and erucic acid amide.

The substituted amide is not particularly limited, but examples thereof include N-oleyl palmitic acid amide, N-stearylstearic acid amide, N-stearyl oleic acid amide, (N-oleyl)stearic acid amide, N-stearyl erucic acid amide and the like. The methylolamide is not particularly limited, and examples thereof include methylolstearic acid amide and the like.

The saturated fatty acid bis-amide is not particularly limited, but examples thereof include methylene bis-stearic acid amide, ethylene bis-capric acid amide, ethylene bis-lauric acid amide, ethylene bis-stearic acid amide, ethylene bis-hydroxy acid amide, ethylene bis-behenic acid amide, hexamethylene bis-stearic acid amide, hexamethylene bis-behenic acid amide, hexamethylene hydroxystearic acid amide, N,N'-distearyl adipic acid amide, N,N'-distearyl sebacic acid amide and the like.

The unsaturated fatty acid bis-amide is not particularly limited, but examples thereof include ethylene bis-oleic acid amide, ethylene bis-erucic acid amide, hexamethylene bis-oleic acid amide, N,N'-dioleyl sebacic acid amide and the like.

The fatty acid ester amide is not particularly limited but, for example, stearoamidoethyl stearate and the like can be mentioned. The aromatic bis-amide is not particularly limited, but, for example, m-xylylene bis-stearic acid amide, m-xylylene bis-hydroxystearic acid amide, N,N'-distearyl isophthalic acid amide and the like, can be exemplified.

The metal foil layer 4 plays a role of imparting a gas barrier property to prevent invasion of oxygen and moisture into the shape-forming packaging material 1. The metal foil layer 4 is not particularly limited, but examples thereof include an aluminum foil and a copper foil, and an aluminum foil is generally used. The thickness of the metal foil layer 4 is preferably 20 µm to 100 µm. By setting the thickness to 20 µm or more, it is possible to prevent generation of pinholes at the time of rolling when producing a metal foil, and by setting the thickness to 100 µm or less, it is possible to reduce the stress at the time of stretch forming or drawing, thereby improving the formability.

It is preferable that the metal foil layer 4 be subjected to a chemical conversion treatment at least on the inner surface 4a (the surface on the second adhesive layer 6 side). By being subjected to such chemical conversion treatment, corrosion of the surface of the metal foil due to contents (electrolyte of a battery, foods, drugs and medicines, etc.) can be prevented sufficiently. For example, by performing the following treatment, a chemical conversion treatment is subjected to the metal foil. That is, any one of aqueous solutions selected from the group consisting of:

1) an aqueous solution composed of a mixture of phosphoric acid, chromic acid, and fluoride metal salt,
2) an aqueous solution composed of a mixture of phosphoric acid, chromic acid, fluoridemetal salt, and fluoride-nonmetal salt, and
3) an aqueous solution comprising a mixture of acryl-based resin or/and phenol-based resin, phosphoric acid, chromic acid and fluoridemetal salt is applied to the surface of the metal foil subjected to a degreasing treatment, and then drying to thereby perform a chemical conversion treatment.

The first adhesive layer 5 is not particularly limited, but may be, for example, an adhesive layer formed of a two-liquid reaction type adhesive or the like. As the two-liquid reactive adhesive, for example, a two-liquid reaction type adhesive composed of a first liquid composed of one or more polyols selected from the group consisting of polyurethane-based polyol, polyester-based polyol, and polyether-based polyol, and a second liquid (curling agent) composed of isocyanate can be exemplified. The first adhesive layer 5 is formed by applying, for example, the adhesive such as the two-liquid reaction type adhesive to the "upper surface of the metal foil layer 4" and/or to the "lower surface of the heat resistant resin layer 2" by a method, such as, e.g., a Gravure roll coating method.

The second adhesive layer 6 is not particularly limited, but examples thereof include an adhesive layer formed by a polyurethane-based adhesive agent, an acrylic-based adhesive, an epoxy-based adhesive, a polyolefin-based adhesive, an elastomer-based adhesive, a fluorine adhesive, etc. Among them, it is preferable to use an acrylic-based adhesive or a polyolefin-based adhesive. In this case, it is possible to improve the electrolyte resistance and water vapor barrier property of the shape-forming packaging material 1.

In the aforementioned embodiment, the configuration in which the first adhesive layer 5 and the second adhesive layer 6 are provided is adopted, but both the layers 5 and 6 are not indispensable constituent layers and it may be configured to adopt a configuration in which these layers are not provided.

Figure 2:
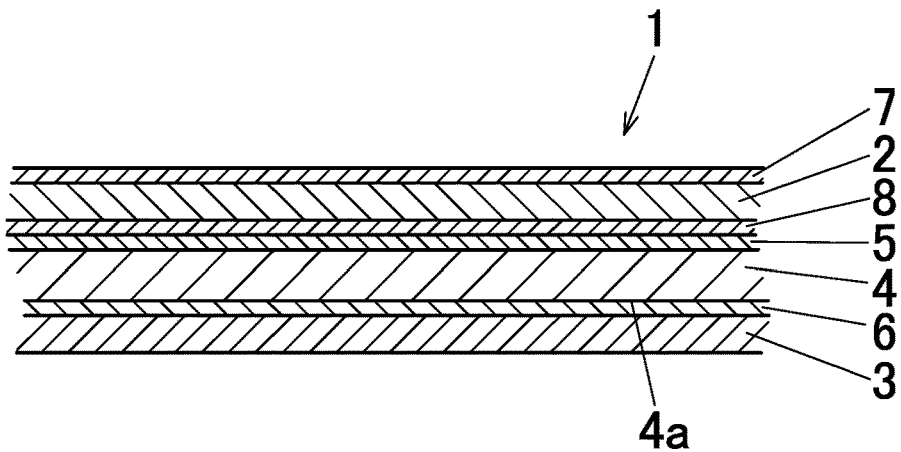
FIG. 2 is a cross-sectional view showing another embodiment of a shape-forming packaging material according to the present invention.

Further, in the above embodiment, the metal foil layer 4 and the heat resistant resin layer 2 are integrally laminated via the first adhesive layer 5. However, a structure (see FIG. 2) may be adopted in which on the surface of the heat resistant resin layer 2 on the side of the metal foil layer 4, a resin layer 8 having the same configuration (same composition) as the various examples exemplified as the print improving resin layer 7 is laminated and a metal foil layer 4 is laminated on the resin layer 8 via a first adhesive layer 5. By adopting such a configuration, it is possible to further improve the bonding strength between the metal foil layer 4 and the heat resistant resin layer (outer layer) 2.

Figure 4:
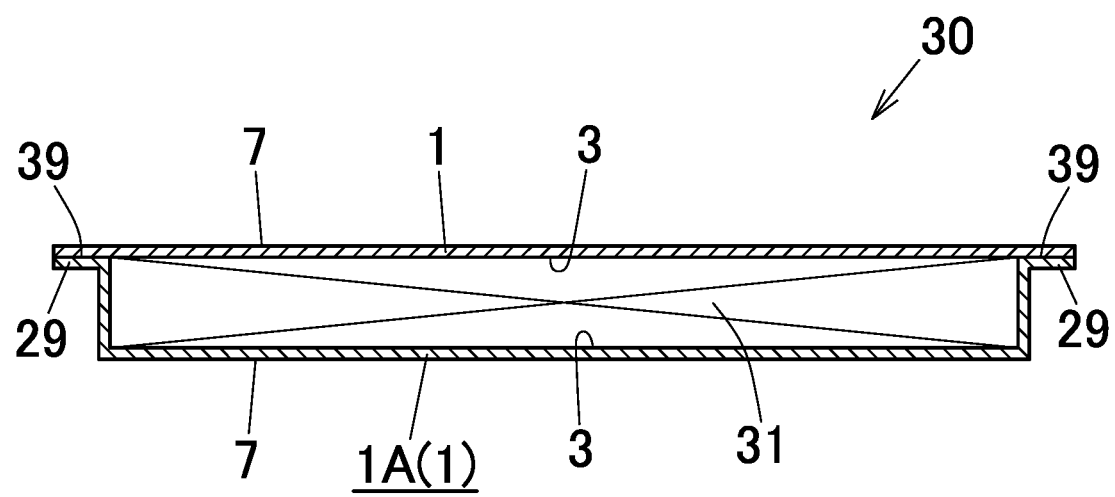
FIG. 4 is a cross-sectional view showing an embodiment of a power storage device with surface printing.

By shaping (deep drawing, bulging, etc.) the shape-forming packaging material 1 according to the present disclosure, a shaped case (battery case or the like) 1A as shown in FIG. 4 can be obtained. Although the shape of the shaped case is not particularly limited, for example, a substantially rectangular parallelepiped shape with one surface (upper surface) opened as shown in FIG. 4 can be exemplified.

As described above, a lubricant is usually added to the heat fusible resin layer 3 of the shape-forming packaging material, but this lubricant appears on (adheres to) the surface of the heat fusible resin layer 3 due to the partial bleeding with time.

It is generally performed such that the shape-forming packaging material 1 containing a lubricant as described above is wound in a roll form in a manner in which the heat fusible resin layer 3 and the print improving resin layer 7 are in contact with each other to store as a roll body or to prepare for the next process, and the like.

Thus, a power storage device 30 with surface printing can be manufactured, for example, as follows. That is, the shape-forming packaging material is unrolled from the roll body, and a power storage device main body 31 is packaged with the unrolled shape-forming packaging material to obtain a power storage device. Next, printing is performed on the outside surface (outer surface) of the printing improving resin layer 7 of the shape-forming packaging material 1 in the packaged state of the power storage device with an ink or the like to thereby produce a power storage device 30 with surface printing (see FIG. 4). By the printing, for example, a lot number, a QR code (which is a registered trademark), etc., is printed.

The adhesion amount of the lubricant present on the surface of the heat fusible resin layer 3 of the shape-forming packaging material unrolled from the roll body is preferably 0.05 mg/m$^2$ to 6 mg/m$^2$, and the lubricant adhesion amount of the surface (outer surface) of the printing improving resin layer 7 of the shape-forming packaging material unrolled from the roll body is preferably 0.1 mg/m$^2$ to 5 mg/m$^2$.

The lubricant on the outer surface of the print improving resin layer 7 is a lubricant presented on the surface of the heat fusible resin layer 3 and transferred to the outer surface of the print improving resin layer 7 when rolled. The printing is performed on the outer surface of the print improving resin layer 7 to which the lubricant is adhered.

Figure 3:
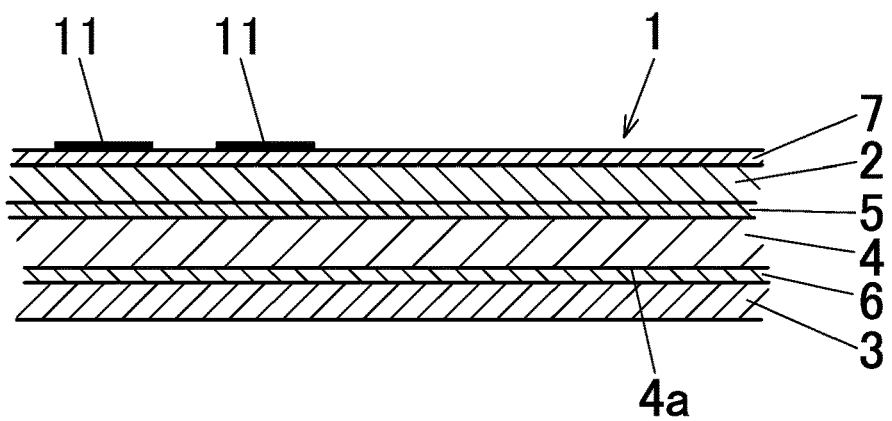
FIG. 3 is a cross-sectional view showing a part of a shape-forming packaging material in a power storage device with surface printing according to the present invention.

In the power storage device 30 with surface printing obtained as described above, a print portion (print ink layer, etc.) 11 is laminated on the outer surface of the printing improving resin layer 7 of the shape-forming packaging material 1 packaging the power storage device main body 31 (on the surface opposite to the metal foil layer 4 side in the print improving resin layer 7) (see FIG. 3). Since the print portion (print ink layer, etc.) 11 is provided on the outer surface of the shape-forming packaging material 1 of the power storage device 30, for example, a lot number, a QR code (which is a registered trademark), etc., is displayed.

An embodiment of the aforementioned power storage device 30 with surface printing is shown in FIG. 4. As shown in FIG. 4, a substantially rectangular parallelepiped power storage device main body 31 is accommodated in a storage recess of the shaped case 1A obtained by shaping the shape-forming packaging material 1 of the present disclosure. The shape-forming packaging material 1 of the present disclosure is disposed on the power storage device main body 31 with its inner layer 3 side facing inward (downward). The periphery of the inner layer 3 of the planar packaging material 1 and the inner layer 3 of the flange portion (sealing peripheral portion) 29 of the shaped case 1A are seal-bonded by heat sealing. Thus, the power storage device 30 of the present disclosure is configured.

In FIG. 4, the reference numeral 39 denotes a heat seal portion in which the peripheral portion of the packaging material 1 and the flange portion (sealing peripheral portion) 29 of the shaped case 1A are joined (fused).

Although the power storage device main body 31 is not particularly limited, it may be exemplified by, for example, a battery main body portion, a capacitor main body portion, and an electrical condenser main body portion.

EXAMPLES

Next, specific examples of the present invention will be described, but the present invention is not particularly limited to those of these examples.
<Resin Composition for Forming Print Improving Resin Layer> (Resin Composition W)

70 parts by mass of "Takelac W-6010" manufactured by Mitsui Chemicals, Inc., as an aqueous urethane resin, 30 parts by mass of "Denacol EX-521" manufactured by Nagase Chemtech Corporation as an aqueous epoxy resin, and 5 parts by mass of colloidal silica "Snowtex ST-C" (average particle diameter of 10 nm to 20 nm) manufactured by Nissan Chemical Industries, Ltd., as an anti-blocking agent were mixed, and ion exchanged water was added to dilute. Thus, a resin composition W having 2 mass % of a nonvolatile content rate was obtained.
(Resin Composition V)

70 parts by mass of "Rikabond SA-513" manufactured by Chuo Rika Kogyo Co., Ltd. as an aqueous acrylic acid ester resin, 30 parts by mass of "Denacol EX-521" manufactured by Nagase Chemtech Corporation as an aqueous epoxy resin, and 5 parts by mass of colloidal silica "Snowtex ST-C" (average particle diameter of 10 nm to 20 nm) manufactured by Nissan Chemical Industries, Ltd., as an anti-blocking agent were mixed, and ion exchanged water was added to dilute. Thus, a resin composition V having 2 mass % of a nonvolatile content rate was obtained.
(Resin Composition Z)

100 parts by mass of "Denacol EX-521" manufactured by Nagase Chemtek Corporation as an aqueous epoxy resin and 5 parts by mass of colloidal silica "Snowtex ST-C" (average particle diameter of 10 nm to 20 nm) manufactured by Nissan Chemical Industries, Ltd., as an anti-blocking agent were mixed, and ion exchanged water was added to dilute. Thus, a resin composition Z having 2 mass % of a nonvolatile content rate was obtained.

Example 1

The resin composition W was applied by a gravure roll coating method on one surface of a biaxially stretched nylon (6 nylon) film (MD/TD=0.95, heat resistant resin layer) 2 having a thickness of 15 μm and a hot water shrinkage percentage of 4.0% obtained by stretching with a simultaneous biaxial stretching method and dried. Thereafter, it was left for 1 day in an environment of 40° C. to allow a curing reaction to thereby form a print improving resin layer 7 having a formation amount of 0.1 g/m².

On the other hand, a chemical conversion treatment solution composed of polyacrylic acid, trivalent chromium compound, phosphoric acid, water, and alcohol was applied to both surfaces of an aluminum foil 4 having a thickness of 35 μm, and drying was performed at 180° C. so that a chromium adhesion amount became 10 mg/m².

Next, to one surface of the aluminum foil 4 subjected to the chemical conversion treatment, the other surface of the biaxially stretched nylon film 2 (the surface opposite to the side on which the print improving resin layer 7 was formed) was adhered via a polyester polyurethane adhesive 5. Next, an unstretched polypropylene film (heat fusible resin layer) 3 having a thickness of 30 μm was adhered to the other surface of the aluminum foil 4 via a maleic anhydride-modified polypropylene adhesive 6. And it is was left for 5 days in an environment of 40° C. to thereby obtain a shape-forming packaging material 1 shown in FIG. 1.

As the unstretched polypropylene film 3, a three-layer laminated film composed of a 3 μm polypropylene random copolymer layer (erucic acid amide having a content rate 1,000 ppm)/a 24 μm polypropylene based block copolymer layer (erucic acid amide having a content rate 3,000 ppm)/a 3 μm polypropylene random copolymer layer (erucic acid amide having a content rate 1,000 ppm) was used.

Next, the obtained shape-forming packaging material 1 was rolled in a manner such that the heat fusible resin layer 3 and the print improving resin layer 7 were in contact with each other to obtain a roll body. After storing it in this state at 40° C. for 5 days, the shape-forming packaging material was unrolled from the roll body. The erucic acid amide adhesion amount on the surface (outer surface) of the print improving resin layer 7 in the shape-forming packaging material unrolled from the roll body was 2.5 mg/m², and the erucic acid amide adhesion amount on the surface of heat fusible resin layer 3 was 3.0 mg/m².

Example 2

A shape-forming packaging material 1 unrolled from the roll body was obtained (see FIG. 1) in the same manner as in Example 1 except that a biaxially stretched 6 nylon film (MD/TD=0.9) having a thickness of 15 μm and a hot water shrinkage percentage of 2.5% obtained by stretching with a simultaneous biaxial stretching method was used in place of a biaxially stretched 6 nylon film (MD/TD=0.95) having a thickness of 15 μm and a hot water shrinkage percentage of 4.0%.

Example 3

A shape-forming packaging material 1 unrolled from the roll body was obtained (see FIG. 1) in the same manner as in Example 1 except that a biaxially stretched 6 nylon film (MD/TD=1.0) having a thickness of 15 μm and a hot water shrinkage percentage of 3.5% obtained by stretching with a simultaneous biaxial stretching method was used in place of a biaxially stretched 6 nylon film (MD/TD=0.95) having a thickness of 15 μm and a hot water shrinkage percentage of 4.0%.

Example 4

A shape-forming packaging material 1 unrolled from the roll body was obtained (see FIG. 1) in the same manner as in Example 1 except that a biaxially stretched 6 nylon film (MD/TD=1.1) having a thickness of 15 μm and a hot water shrinkage percentage of 5.0% obtained by stretching with a simultaneous biaxial stretching method was used in place of a biaxially stretched 6 nylon film (MD/TD=0.95) having a thickness of 15 μm and a hot water shrinkage percentage of 4.0%.

Example 5

A shape-forming packaging material 1 unrolled from the roll body was obtained (see FIG. 1) in the same manner as in Example 1 except that a biaxially stretched 6 nylon film (MD/TD=0.9) having a thickness of 15 μm and a hot water shrinkage percentage of 10% obtained by stretching with a simultaneous biaxial stretching method was used in place of a biaxially stretched 6 nylon film (MD/TD=0.95) having a thickness of 15 μm and a hot water shrinkage percentage of 4.0%.

Example 6

A shape-forming packaging material 1 unrolled from the roll body was obtained (see FIG. 1) in the same manner as in Example 1 except that a biaxially stretched 6 nylon film (MD/TD=1.05) having a thickness of 15 μm and a hot water shrinkage percentage of 15% obtained by stretching with a simultaneous biaxial stretching method was used in place of a biaxially stretched 6 nylon film (MD/TD=0.95) having a thickness of 15 μm and a hot water shrinkage percentage of 4.0%.

Comparative Example 1

A shape-forming packaging material unrolled from the roll body was obtained in the same manner as in Example 1 except that it was configured not to provide a print improving resin layer 7.

Example 7

A shape-forming packaging material 1 unrolled from the roll body was obtained (see FIG. 1) in the same manner as in Example 1 except that a biaxially stretched polyethylene terephthalate (PET) film (MD/TD=1.0) having a thickness of 15 μm and a hot water shrinkage percentage of 3.0% obtained by a sequential biaxially stretching method was used in place of a biaxially stretched 6 nylon film (MD/TD=0.95) having a thickness of 15 μm and a hot water shrinkage percentage of 4.0%.

Example 8

A shape-forming packaging material 1 unrolled from the roll body was obtained (see FIG. 1) in the same manner as in Example 1 except that a biaxially stretched polyethylene terephthalate (PET) film (MD/TD=1.0) having a thickness of 15 μm and a hot water shrinkage percentage of 5.0% obtained by a sequential biaxially stretching method was used in place of a biaxially stretched 6 nylon film (MD/TD=0.95) having a thickness of 15 μm and a hot water shrinkage percentage of 4.0%.

Example 9

A shape-forming packaging material 1 unrolled from the roll body was obtained (see FIG. 1) in the same manner as in Example 1 except that a biaxially stretched polyethylene terephthalate (PET) film (MD/TD=0.9) having a thickness of 15 μm and a hot water shrinkage percentage of 15% obtained by a sequential biaxially stretching method was used in place of a biaxially stretched 6 nylon film (MD/TD=0.95) having a thickness of 15 μm and a hot water shrinkage percentage of 4.0%.

Comparative Example 2

A shape-forming packaging material unrolled from the roll body was obtained in the same manner as in Example 8 except that it was configured not to provide the print improving resin layer 7.

Example 10

A shape-forming packaging material 1 unrolled from the roll body was obtained (see FIG. 1) in the same manner as in Example 1 except that a biaxially stretched polyethylene naphthalate (PEN) film (MD/TD=0.9) having a thickness of 15 μm and a hot water shrinkage percentage of 3.0% obtained by a sequential biaxially stretching method was used in place of a biaxially stretched 6 nylon film (MD/TD=0.95) having a thickness of 15 μm and a hot water shrinkage percentage of 4.0%.

Example 11

A shape-forming packaging material 1 unrolled from the roll body was obtained (see FIG. 1) in the same manner as in Example 1 except that a biaxially stretched polyethylene naphthalate (PEN) film (MD/TD=0.9) having a thickness of 15 μm and a hot water shrinkage percentage of 5.0% obtained by a sequential biaxially stretching method was used in place of a biaxially stretched 6 nylon film (MD/TD=0.95) having a thickness of 15 μm and a hot water shrinkage percentage of 4.0%.

Example 12

A shape-forming packaging material 1 unrolled from the roll body was obtained (see FIG. 1) in the same manner as in Example 1 except that a biaxially stretched polyethylene naphthalate (PEN) film (MD/TD=0.9) having a thickness of 15 μm and a hot water shrinkage percentage of 15% obtained by a sequential biaxially stretching method was used in place of a biaxially stretched 6 nylon film (MD/TD=0.95) having a thickness of 15 μm and a hot water shrinkage percentage of 4.0%.

Comparative Example 3

A shape-forming packaging material unrolled from the roll body was obtained in the same manner as in Example 11 except that it was configured not to provide print improving resin layer 7.

Example 13

A shape-forming packaging material 1 unrolled from the roll body was obtained (see FIG. 1) in the same manner as in Example 1 except that a biaxially stretched polybutylene terephthalate (PBT) film (MD/TD=0.9) having a thickness of 15 μm and a hot water shrinkage percentage of 4.0% obtained by stretching with a simultaneous biaxial stretching method was used in place of a biaxially stretched 6 nylon film (MD/TD=0.95) having a thickness of 15 μm and a hot water shrinkage percentage of 4.0%.

Example 14

A shape-forming packaging material 1 unrolled from the roll body was obtained (see FIG. 1) in the same manner as in Example 1 except that a biaxially stretched polybutylene terephthalate (PBT) film (MD/TD=0.9) having a thickness of 15 μm and a hot water shrinkage percentage of 6.0% obtained by stretching with a simultaneous biaxial stretching method was used in place of a biaxially stretched 6 nylon film (MD/TD=0.95) having a thickness of 15 μm and a hot water shrinkage percentage of 4.0%.

Example 15

A shape-forming packaging material 1 unrolled from the roll body was obtained (see FIG. 1) in the same manner as in Example 1 except that a biaxially stretched polybutylene terephthalate (PBT) film (MD/TD=0.9) having a thickness of 15 μm and a hot water shrinkage percentage of 15% obtained by stretching with a simultaneous biaxial stretching method was used in place of a biaxially stretched 6 nylon film (MD/TD=0.95) having a thickness of 15 μm and a hot water shrinkage percentage of 4.0%.

Comparative Example 4

A shape-forming packaging material unrolled from the roll body was obtained in the same manner as in Example 14 except that it was configured not to provide print improving resin layer 7.

Example 16

A shape-forming packaging material 1 unrolled from the roll body was obtained (see FIG. 1) in the same manner as in Example 1 except that an adhesive composition V was used in place of the adhesive composition W.

Example 17

A shape-forming packaging material 1 unrolled from the roll body was obtained (see FIG. 1) in the same manner as in Example 1 except that an adhesive composition V was used in place of the adhesive composition W and that a biaxially stretched polyethylene terephthalate (PET) film (MD/TD=0.9) having a thickness of 15 μm and a hot water shrinkage percentage of 10% obtained by a sequential biaxially stretching method was used in place of a biaxially stretched 6 nylon film (MD/TD=0.95) having a thickness of 15 μm and a hot water shrinkage percentage of 4.0%.

Example 18

A shape-forming packaging material 1 unrolled from the roll body was obtained (see FIG. 1) in the same manner as in Example 1 except that an adhesive composition V was used in place of the adhesive composition W and that a biaxially stretched polyethylene naphthalate (PEN) film (MD/TD=0.9) having a thickness of 15 μm and a hot water shrinkage percentage of 5.0% obtained by a sequential biaxially stretching method was used in place of a biaxially stretched 6 nylon film (MD/TD=0.95) having a thickness of 15 μm and a hot water shrinkage percentage of 4.0%.

Example 19

A shape-forming packaging material 1 unrolled from the roll body was obtained (see FIG. 1) in the same manner as in Example 1 except that an adhesive composition V was used in place of the adhesive composition W and that a biaxially stretched polybutylene terephthalate (PBT) film (MD/TD=0.9) having a thickness of 15 μm and a hot water shrinkage percentage of 6.0% obtained by stretching with a simultaneous biaxial stretching method was used in place of a biaxially stretched 6 nylon film (MD/TD=0.95) having a thickness of 15 μm and a hot water shrinkage percentage of 4.0%.

Example 20

A shape-forming packaging material 1 unrolled from the roll body was obtained (see FIG. 1) in the same manner as in Example 1 except that an adhesive composition Z was used in place of the adhesive composition W and that a biaxially stretched 6 nylon film (MD/TD=0.9) having a thickness of 15 μm and a hot water shrinkage percentage of 10% obtained by stretching with a simultaneous biaxial stretching method was used in place of a biaxially stretched 6 nylon film (MD/TD=0.95) having a thickness of 15 μm and a hot water shrinkage percentage of 4.0%.

Example 21

A shape-forming packaging material 1 unrolled from the roll body was obtained (see FIG. 1) in the same manner as in Example 1 except that an adhesive composition Z was used in place of the adhesive composition W and that a biaxially stretched polyethylene terephthalate (PET) film (MD/TD=0.9) having a thickness of 15 μm and a hot water shrinkage percentage of 5.0% obtained by a sequential biaxially stretching method was used in place of a biaxially stretched 6 nylon film (MD/TD=0.95) having a thickness of 15 μm and a hot water shrinkage percentage of 4.0%.

Example 22

A shape-forming packaging material unrolled from the roll body was obtained (see FIG. 1) in the same manner as in Example 1 except that an adhesive composition Z was used in place of the adhesive composition W and that a biaxially stretched polyethylene naphthalate (PEN) film (MD/TD=0.9) having a thickness of 15 μm and a hot water shrinkage percentage of 4.0% obtained by a sequential biaxially stretching method was used in place of a biaxially stretched 6 nylon film (MD/TD=0.95) having a thickness of 15 μm and a hot water shrinkage percentage of 4.0%.

Example 23

A shape-forming packaging material unrolled from the roll body was obtained (see FIG. 1) in the same manner as in Example 1 except that an adhesive composition Z was used in place of the adhesive composition W and that a biaxially stretched polybutylene terephthalate (PBT) film (MD/TD=0.9) having a thickness of 15 μm and a hot water shrinkage percentage of 6.0% obtained by stretching with a simultaneous biaxial stretching method was used in place of a biaxially stretched 6 nylon film (MD/TD=0.95) having a thickness of 15 μm and a hot water shrinkage percentage of 4.0%.

Example 24

A shape-forming packaging material unrolled from the roll body was obtained (see FIG. 1) in the same manner as in Example 1 except that as the unstretched polypropylene film 3, a three-layer laminated film composed of a 3 μm random polypropylene layer (erucic acid amide having a content rate of 500 ppm)/a 24 μm block polypropylene layer (erucic acid amide having a content rate 1,500 ppm)/a 3 μm random polypropylene layer (erucic acid amide having a content rate of 500 ppm) was used.

The erucic acid amide adhesion amount on the surface (outer surface) of the print improving resin layer 7 in the shape-forming packaging material unrolled from the roll body was 0.8 mg/m², and the erucic acid amide adhesion amount on the surface of heat fusible resin layer 3 was 1.0 mg/m².

Example 25

A shape-forming packaging material unrolled from the roll body was obtained (see FIG. 1) in the same manner as in Example 1 except that as the unstretched polypropylene film 3, a three-layer laminated film composed of a 3 μm random polypropylene layer (erucic acid amide having a content rate 1,500 ppm)/a 24 μm block polypropylene layer (erucic acid amide having a content rate 3,000 ppm)/a 3 μm random polypropylene layer (erucic acid amide having a content rate of 1,500 ppm) was used.

The erucic acid amide adhesion amount on the surface (outer surface) of the print improving resin layer 7 in the shape-forming packaging material unrolled from the roll body was 3.5 mg/m², and the erucic acid amide adhesion amount on the surface of heat fusible resin layer 3 was 4.0 mg/m².

With respect to each shape-forming packaging material obtained as described above, evaluation was conducted based on the following evaluation method. The evaluation results are shown in Tables 1 to 4.

TABLE 1

|  |  | Ex. 1 | Ex. 2 | Ex. 3 | Ex. 4 | Ex. 5 | Ex. 6 | Comp. Ex. 1 |
|---|---|---|---|---|---|---|---|---|
| Adhesion amount of lubricant on the surface of the printing improving resin layer (mg/m²) |  | 2.5 | 2.5 | 2.5 | 2.5 | 2.5 | 2.5 | 2.8 |
| Configuration of printing improving resin layer | Resin Composition | W | W | W | W | W | W |  |
|  | Formation amount (g/m²) | 0.1 | 0.1 | 0.1 | 0.1 | 0.1 | 0.1 |  |
| Configuration of outer layer | Type of resin | Nylon | Nylon | Nylon | Nylon | Nylon | Nylon | Nylon |
|  | Hot water shrinkage (%) | 4.0 | 2.5 | 3.5 | 5.0 | 10 | 15 | 4.0 |
| Adhesion amount of the lubricant on the surface of the heat-fusible resin layer (mg/m²) |  | 3.0 | 3.0 | 3.0 | 3.0 | 3.0 | 3.0 | 3.0 |
| Presence or absence of peeling of the print ink portion | Immediately after deep drawing | ◎ | ◎ | ◎ | ◎ | ◎ | ◎ | X |
|  | After high temperature high humidity test | ◎ | ◎ | ◎ | ◎ | ◎ | ◎ | X |

TABLE 2

|  |  | Ex. 7 | Ex. 8 | Ex. 9 | Comp. Ex. 2 | Ex. 10 | Ex. 11 | Ex. 12 | Comp. Ex. 3 |
|---|---|---|---|---|---|---|---|---|---|
| Adhesion amount of lubricant on the surface of the printing improving resin layer (mg/m²) |  | 2.5 | 2.5 | 2.5 | 2.3 | 2.5 | 2.5 | 2.5 | 2.3 |
| Configuration of Printing improving resin layer | Resin Composition | W | W | W |  | W | W | W |  |
|  | Formation amount (g/m²) | 0.1 | 0.1 | 0.1 |  | 0.1 | 0.1 | 0.1 |  |
| Configuration of outer layer | Type of resin | PET | PET | PET | PET | PEN | PEN | PEN | PEN |
|  | Hot water shrinkage (%) | 3.0 | 5.0 | 15 | 5.0 | 3.0 | 5.0 | 15 | 5.0 |
| Adhesion amount of the lubricant on the surface of the heat-fusible resin layer (mg/m²) |  | 2.8 | 2.8 | 2.8 | 2.8 | 2.8 | 2.8 | 2.8 | 2.8 |
| Presence or absence of peeling of print ink portion | Immediately after deep drawing | ◎ | ◎ | ◎ | X | ◎ | ◎ | ◎ | X |
|  | After high temperature high humidity test | ◎ | ◎ | ◎ | X | ◎ | ◎ | ◎ | X |

TABLE 3

|  |  | Ex. 13 | Ex. 14 | Ex. 15 | Cop. Ex. 4 | Ex. 24 | Ex. 25 |
|---|---|---|---|---|---|---|---|
| Adhesion amount of lubricant on the surface of the printing improving resin layer (mg/m$^2$) | | 2.5 | 2.5 | 2.5 | 2.3 | 0.8 | 3.5 |
| Configuration of the printing improving resin layer | Resin Composition | W | W | W |  | W | W |
|  | Formation amount (g/m$^2$) | 0.1 | 0.1 | 0.1 |  | 0.1 | 0.1 |
| Configuration of the outer layer | Type of resin | PBT | PBT | PBT | PBT | Nylon | Nylon |
|  | Hot water shrinkage (%) | 4.0 | 6.0 | 15 | 6.0 | 4.0 | 4.0 |
| Adhesion amount of the lubricant on the surface of the heat-fusible resin layer (mg/m$^2$) | | 2.9 | 2.9 | 2.9 | 2.9 | 1.0 | 4.0 |
| Presence or absence of peeling of print ink portion | Immediately after deep drawing | ◉ | ◉ | ◉ | X | ◉ | ◉ |
|  | After high temperature high humidity test | ◉ | ◉ | ◉ | X | ◉ | ◉ |

TABLE 4

|  |  | Ex. 16 | Ex. 17 | Ex. 18 | Ex. 19 | Ex. 20 | Ex. 21 | Ex. 22 | Ex. 23 |
|---|---|---|---|---|---|---|---|---|---|
| Adhesion amount of lubricant on the surface of printing improving resin layer (mg/m$^2$) | | 2.2 | 2.2 | 2.2 | 2.2 | 2.1 | 2.1 | 2.1 | 2.1 |
| Configuration of the printing improving resin layer | Resin Composition | V | V | V | V | Z | Z | Z | Z |
|  | Formation amount (g/m$^2$) | 0.1 | 0.1 | 0.1 | 0.1 | 0.1 | 0.1 | 0.1 | 0.1 |
| Configuration of outer layer | Type of resin | Nylon | PET | PEN | PBT | Nylon | PET | PEN | PBT |
|  | Hot water shrinkage (%) | 4.0 | 10 | 5.0 | 6.0 | 10 | 5.0 | 4.0 | 6.0 |
| Adhesion amount of the lubricant on the surface of the heat-fusible resin layer (mg/m$^2$) | | 3.0 | 3.0 | 3.0 | 3.0 | 2.7 | 2.7 | 2.7 | 2.7 |
| Presence or absence of peeling of the print ink portion | Immediately after deep drawing | ◉ | ◉ | ◉ | ◉ | ◉ | ◉ | ◉ | ◉ |
|  | After high temperature high humidity test | ◉ | ◉ | ◉ | ◉ | ◉ | ◉ | ◉ | ◉ |

<Evaluation Method for Presence and Absence of Peeling of Print Ink Portion>

For each Example and each Comparative Example, 30 pieces of shape-forming packaging materials were produced respectively, and letters and a bar code were printed with white ink on a part of the surface of the printing improving resin layer of the shape-forming packaging material using an ink jet printer. With regard to these shape-forming packaging materials to which surface printing was made, the presence or absence of bleeding of the letters and the bar code on the printing ink portion and the presence or absence of peeling of the printing ink portion were examined with a naked eye under the following two conditions a) and b) and evaluated based on the following judgment criteria.
(Judgment Criteria)
  "◉" denotes the number of bled and/or peeled print ink portions was 0 out of 30
  "○" denotes the number of bled and/or peeled print ink portions was 1 or 2 out of 30
  "Δ" denotes the number of bled and/or peeled print ink portions was 3 or 4 out of 30
  "X" denotes the number of bled and/or peeled print ink portions was 5 or 30 out of 30
  a) a shape-forming packaging material with surface printing immediately after deep drawing (shaped case immediate after shaping obtained by subjecting the aforementioned surface printing shape-forming packaging material to deep drawing into a rectangular parallelepiped shape of 50 mm in length×35 mm in width×6.0 mm in depth in a manner such that the polypropylene layer 3 as the inner layer is in contact with the punch suing a punch, a die, etc.)
  b) a shape-forming packaging material with surface printing immediately after a high temperature high humidity test (a surface printing shape-forming packaging material left in a high temperature high humidity tester of 85° C.×95% RH for 72 hours, took out and left at a room temperature for 5 days)

As is apparent from Tables 1 to 4, in the shape-forming packaging materials of Examples 1 to 25 according to the present disclosure, the print ink portion does not blur or peel off when deep drawing is performed, and even when used in a somewhat harsh environment, such as, a high temperature environment and a high humidity environment, the print ink portion was not blurred or peeled.

On the other hand, in the shape-forming packaging materials of Comparative Examples 1 to 4, since no print improving resin layer was provided, the printing ink portion was sometimes blurred or peeled off in at least one of the aforementioned conditions a) and b).

INDUSTRIAL APPLICABILITY

The shape-forming packaging material according to the present disclosure is suitably used as, for example, a case of a battery (lithium-ion secondary battery) for use in a laptop computer, a cellular phone, an automobile, or a stationary device. Besides this, it is suitably used as a packaging material for foods and as a packaging material for pharmaceuticals, but not particularly limited thereto. Among them, it is particularly suitably used as a battery case.

The present application claims priority to Japanese Patent Application No. 2017-22816 filed on Feb. 10, 2017, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention. The present invention allows any design changes unless departing from its spirit within the scope of the claims.

DESCRIPTION OF REFERENCE SYMBOLS

1: shape-forming packaging material
2: heat resistant resin layer (outer layer)
3: heat fusible resin layer (inner layer)
4: metal foil layer
7: print improving resin layer
11: print portion
30: power storage device (power storage device with surface printing)
31: power storage device main body

The invention claimed is:

1. A shape-forming packaging material comprising:
a heat resistant resin layer as an outer layer;
a heat fusible resin layer as an inner layer; and
a metal foil layer disposed between the heat resistant resin layer and the heat fusible resin layer,
wherein a print improving resin layer is laminated on an outer side of the heat resistant resin layer opposite the metal foil layer, the print improving resin layer includes a formation amount of between 0.01 g/m$^2$ and 0.5 g/m$^2$,
wherein a lubricant is exuded to an outer surface of the heat fusible resin layer, the lubricant then is adhered without lamination to an outer surface of the print improving resin layer wherein an adhesion amount of the lubricant on the outer surface of the print improving resin layer is 0.1 mg/m$^2$ to 2.5 mg/m$^2$ and wherein the adhesion amount of lubricant on the outer surface of the printing improving resin layer is smaller than the adhesion amount of the lubricant on the outer surface of the heat-fusible resin layer, and
wherein the print improving resin layer is a single layer that is an outermost layer of the packaging material.

2. The shape-forming packaging material as recited in claim 1, wherein
the print improving resin layer contains one or more resins selected from the group consisting of an epoxy resin, a urethane resin, an acrylic acid resin, a methacrylic acid resin, an acrylic acid ester resin, a methacrylic acid ester resin, a polyester resin, and a polyethyleneimine resin.

3. The shape-forming packaging material as recited in claim 1, wherein
the print improving resin layer contains a urethane resin and an epoxy resin.

4. The shape-forming packaging material as recited in claim 3, wherein
in the print improving resin layer, a content mass ratio of the urethane resin/the epoxy resin is in a range of 98/2 to 40/60.

5. The shape-forming packaging material as recited in claim 1, wherein
the print improving resin layer contains one or more acrylic resins selected from the group consisting of an acrylic acid ester resin and a methacrylic acid ester resin, and an epoxy resin.

6. The shape-forming packaging material as recited in claim 5, wherein
in the print improving resin layer, a content mass ratio of the acrylic resin/the epoxy resin is in a range of 98/2 to 40/60.

7. The shape-forming packaging material as recited in claim 1, wherein
the heat resistant resin layer is composed of a biaxially stretched polyamide film, a biaxially stretched polyethylene naphthalate film, a biaxially stretched polyethylene terephthalate film, or a biaxially stretched polybutylene terephthalate film.

8. A method for producing a shaped case, comprising:
deep drawing or stretch forming the shape-forming packaging material as recited in claim 1.

9. A method for producing a battery case, comprising:
deep drawing or stretch forming the shape-forming packaging material as recited in claim 1.

10. A method for producing a power storage device with surface printing, comprising:
obtaining a roll body by rolling the shape-forming packaging material containing the lubricant in the heat fusible resin layer as recited in claim 1 in a manner such that the heat fusible resin layer and the print improving resin layer are in contact with each other;
obtaining a power storage device by unrolling the shape-forming packaging material from the roll body and packaging a power storage device main body with the unrolled shape-forming packaging material; and
printing on the outer surface of the print improving resin layer of the shape-forming packaging material in a state in which the power storage device is packaged.

11. The method for producing a power storage device with surface printing as recited in claim 10, wherein
the lubricant is adhered to the outer surface of the print improving resin layer of the shape-forming packaging material unrolled from the roll body, and
the lubricant on the outer surface of the print improving resin layer is a lubricant presented on a surface of the heat fusible resin layer and transferred to the outer surface of the print improving resin layer when rolled, and
printing is performed on the outer surface of the print improving resin layer to which the lubricant is adhered.

12. A shape-forming packaging material comprising:
a heat resistant resin layer as an outer layer;
a heat fusible resin layer as an inner layer; and
a metal foil layer disposed between the heat resistant resin layer and the heat fusible resin layer,
a print improving resin layer is laminated on an outer side of the heat resistant resin layer, wherein the print improving resin layer is positioned opposite the metal foil layer, the print improving resin layer includes a formation amount of between 0.01 g/m$^2$ and 0.5 g/m$^2$; wherein an adhesion amount of the lubricant on the outer surface of the print improving resin layer is 0.1 mg/m$^2$ to 2.5 mg/m$^2$ an adhesive layer applied to an inner side of the heat resistant resin layer; and wherein the print improving resin layer is a single layer that is an outermost layer of the packaging material.

13. The shape-forming packaging material of claim 12 wherein the adhesion amount of lubricant on the outer surface of the printing improving resin layer is smaller than the adhesion amount of the lubricant on the outer surface of the heat-fusible resin layer.

* * * * *